US011870585B1

(12) United States Patent
Tayloe et al.

(10) Patent No.: US 11,870,585 B1
(45) Date of Patent: Jan. 9, 2024

(54) ADAPTING HYBRID AUTOMATIC REPEAT REQUESTS

(71) Applicant: NOKIA SOLUTIONS AND NETWORKS OY, Espoo (FI)

(72) Inventors: Daniel Tayloe, Phoenix, AZ (US); Jerry Wang, Marlboro, NJ (US); Heiko Straulino, Eurasburg (DE); Soung Rim, Arlington Heights, IL (US); Timothy Curtis, Chandler, AZ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/109,331

(22) Filed: Feb. 14, 2023

(30) Foreign Application Priority Data

Feb. 18, 2022 (FI) .................................... 20225149

(51) Int. Cl.
*H04W 28/04* (2009.01)
*H04L 1/1812* (2023.01)

(52) U.S. Cl.
CPC .......... *H04L 1/1812* (2013.01); *H04W 28/04* (2013.01)

(58) Field of Classification Search
CPC ... H04L 1/1819; H04L 1/1864; H04L 1/1671; H04L 1/0028; H04L 1/0041; H04L 1/1614; H04L 1/1822; H04W 72/20
See application file for complete search history.

(56) References Cited

U.S. PATENT DOCUMENTS

| | | | |
|---|---|---|---|
| 2007/0223526 A1 | 9/2007 | Jiang | |
| 2018/0139774 A1* | 5/2018 | Ma | H04L 1/189 |
| 2020/0067656 A1 | 2/2020 | Lyu et al. | |
| 2020/0076544 A1 | 3/2020 | Lin et al. | |
| 2020/0313806 A1 | 10/2020 | Wang et al. | |
| 2021/0377912 A1* | 12/2021 | El Hamss | H04L 1/1854 |
| 2021/0409182 A1* | 12/2021 | Lee | H04L 1/1864 |
| 2022/0061041 A1* | 2/2022 | Chen | H04L 5/0048 |
| 2022/0116953 A1* | 4/2022 | Kim | H04L 1/1861 |
| 2022/0239417 A1* | 7/2022 | Cheng | H04L 1/1835 |
| 2022/0399960 A1* | 12/2022 | Bae | H04L 5/00 |
| 2022/0408464 A1* | 12/2022 | MolavianJazi | H04W 72/0453 |
| 2023/0006779 A1* | 1/2023 | Ahn | H04L 1/1822 |
| 2023/0057436 A1* | 2/2023 | Kang | H04W 28/26 |
| 2023/0080567 A1* | 3/2023 | Lin | H04L 1/1819 370/329 |
| 2023/0118018 A1* | 4/2023 | Guo | H04L 1/0061 370/328 |

(Continued)

FOREIGN PATENT DOCUMENTS

WO       2016/154899 A1    10/2016

OTHER PUBLICATIONS

Office Action dated Jun. 22, 2022 corresponding to Finnish Patent Application No. 20225149.

(Continued)

*Primary Examiner* — Syed Ali
(74) *Attorney, Agent, or Firm* — SQUIRE PATTON BOGGS (US) LLP

(57) ABSTRACT

An apparatus is configured to transmit a preconfigured number of transmissions of a first data with hybrid automatic repeat requests consecutively without waiting between the transmissions for response to any of the requests, wherein the preconfigured number is an integer and greater than one.

6 Claims, 4 Drawing Sheets

(56) References Cited

U.S. PATENT DOCUMENTS

2023/0231605 A1* 7/2023 Fröberg Olsson .... H04L 1/0003
370/329
2023/0239869 A1* 7/2023 Wu ...................... H04L 1/1671
370/329

OTHER PUBLICATIONS

Finnish Search Report dated Jun. 22, 2022 corresponding to Finnish Patent Application No. 20225149.
Communication of Acceptance—section 29 a of Patents Decree dated Oct. 12, 2022 corresponding to Finnish Patent Application No. 20225149.
Extended European Search Report dated May 15, 2023 corresponding to European Patent Application No. 23151520.6.
OPPO, "On UL data transmission without UL grant," 3GPP Draft; R1-1720004, 3GPP TSG RAN WG1 Meeting #91, Reno, USA, Nov. 27-Dec. 1, 2017, Nov. 18, 2017, XP051369700.
Sierra Wireless, "Multiple TB Grant Design for Unicast," 3GPP Draft; R1-1808355, 3GPP TSG RAN WG1 Meeting 94, Gothenburg, Sweden, Aug. 20-Aug. 24, 2018, Aug. 10, 2018, XP051515737.
Ericsson, "On DRX, LCP, timing, HARQ, SR/BSR, and CG and SPS," 3GPP Draft; R2-2106089, 3GPP TSG-RAN WG2 #114-e, Electronic meeting, May 19, 2021-May 27, 2021, May 10, 2021, XP052007458.
Nokia et al., "HARQ for NB-IoT/eMTC over NTN," 3GPP Draft; R1-2105407, 3GPP TSG RAN WG1 #105, e-Meeting, May 19-May 27, 2021, May 12, 2021, XP052011426.

* cited by examiner

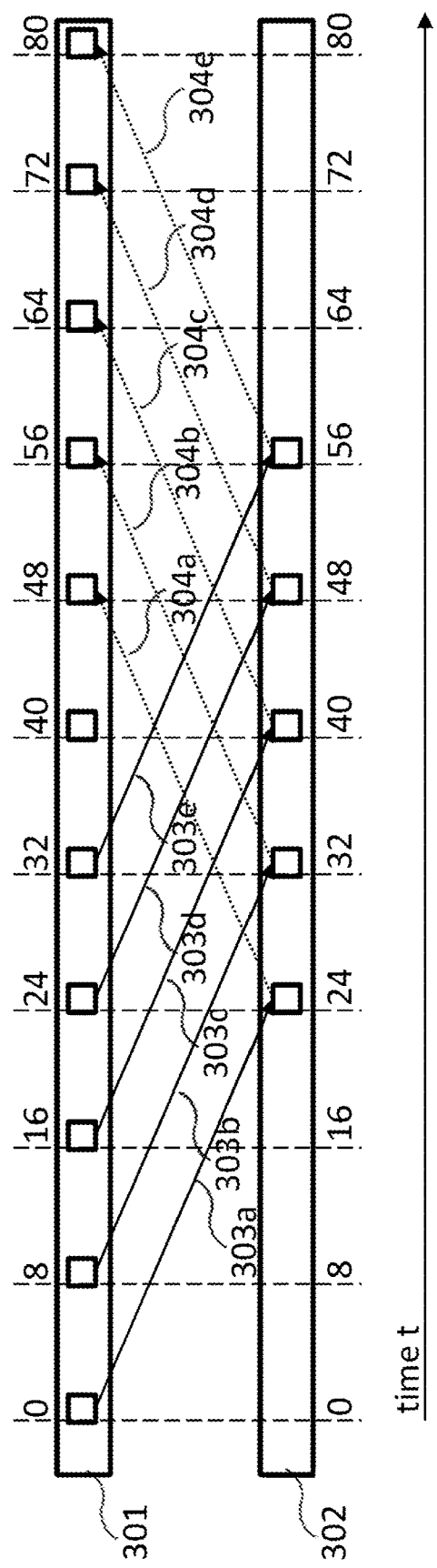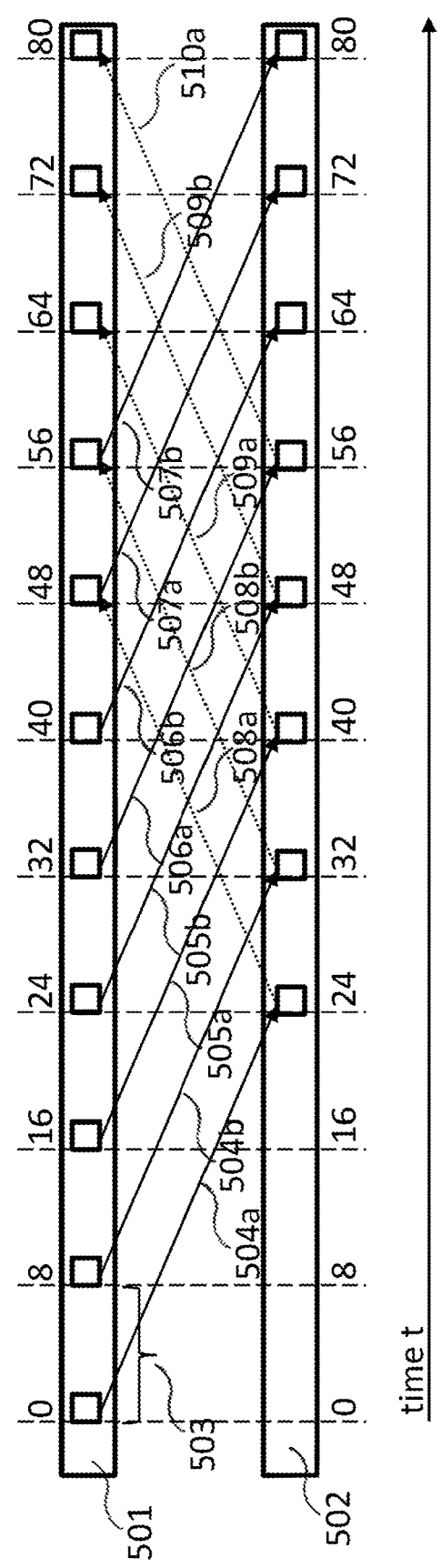
FIG. 3
FIG. 5

ADAPTING HYBRID AUTOMATIC REPEAT REQUESTS

CROSS REFERENCE TO RELATED APPLICATION

This application claims the benefit of Finnish Patent Application No. 20225149, filed Feb. 18, 2022. The entire content of the above-referenced application is hereby incorporated by reference.

TECHNICAL FIELD

Various example embodiments described herein relate to the field of wireless communications.

BACKGROUND

Cellular services using long-term evolution (LTE) and 5G networks may be provided also using low earth orbit satellite system. Hybrid automatic repeat request transmissions are used in long-term evolution (LTE) systems in a stop-and-wait mechanism. The use of low earth orbit satellite system introduces an additional delay to the stop-and-wait mechanism that is longer than the delay in terrestrial networks.

SUMMARY

According to an aspect there is provided an apparatus comprising at least one processor and at least one memory including computer program code, the at least one memory and the computer program code being configured to, with the at least one processor, cause the apparatus at least to perform: transmitting a preconfigured number of transmissions of a first data with hybrid automatic repeat requests consecutively without waiting between the transmissions for response to any of the requests, wherein the preconfigured number is an integer and greater than one.

In an embodiment, the at least one memory and the computer program code are configured to, with the at least one processor, cause the apparatus further to perform: transmitting, while waiting for response to the requests transmitted with the first data, the preconfigured number of consecutive transmissions of further data, and reusing at least one hybrid automatic repeat request identifier, which was used with at least one of the requests transmitted with the first data, with the transmissions of the further data.

In an embodiment, the at least one memory and the computer program code are configured to, with the at least one processor, cause the apparatus further to perform: using a data indicator field in a downlink control indicator to indicate reuse of the hybrid automatic repeat request identifier.

In an embodiment, the at least one memory and the computer program code are configured to, with the at least one processor, cause the apparatus further to perform: changing the data indicator field to allow associating a response to a corresponding transmission when using the at least one hybrid automatic repeat request identifier more than once.

In an embodiment, the at least one memory and the computer program code are configured to, with the at least one processor, cause the apparatus further to perform: reusing hybrid automatic repeat request identifiers used for the first data for transmissions of further data in response to receiving a first response with acknowledgement without waiting for all responses.

In embodiments, the at least one memory and the computer program code are configured to, with the at least one processor, cause the apparatus further to perform prior to transmitting: estimating radio frequency (RF) conditions, determining, based on the radio frequency conditions estimated, the preconfigured number amongst two or more preconfigured numbers, which are integers and at least one of the two or more preconfigured numbers is greater than one, wherein the two or more preconfigured numbers are associated with respective two or more target block error rates, a preconfigured number with a target block error rate, and using the preconfigured number determined and an associated target block error rate for the transmissions with the hybrid automatic repeat requests.

According to an aspect there is provided a method comprising: transmitting a preconfigured number of transmissions of a first data with hybrid automatic repeat requests consecutively without waiting between the transmissions for response to any of the requests, wherein the preconfigured number is an integer and greater than one.

In an embodiment, the method further comprises transmitting, while waiting for response to the requests transmitted with the first data, the preconfigured number of consecutive transmissions of further data, and reusing at least one hybrid automatic repeat request identifier, which was used with at least one of the requests transmitted with the first data, with the transmissions of the further data.

In embodiments, the method further comprises estimating radio frequency (RF) conditions, determining, based on the radio frequency conditions estimated, the preconfigured number amongst two or more preconfigured numbers, which are integers and at least one of the two or more preconfigured numbers is greater than one, wherein the two or more preconfigured numbers are associated with respective two or more target block error rates, a preconfigured number with a target block error rate, and using the preconfigured number determined and an associated target block error rate for the transmissions with the hybrid automatic repeat requests.

According to an aspect there is provided a computer-readable medium comprising program instructions for causing an apparatus to perform at least the following: transmitting a preconfigured number of transmissions of a first data with hybrid automatic repeat requests consecutively without waiting between the transmissions for response to any of the requests, wherein the preconfigured number is an integer and greater than one.

In an embodiment, the computer-readable medium further comprises program instructions for causing the apparatus to further perform at least the following: transmitting, while waiting for response to the requests transmitted with the first data, the preconfigured number of consecutive transmissions of further data, and reusing at least one hybrid automatic repeat request identifier, which was used with at least one of the requests transmitted with the first data, with the transmissions of the further data.

In embodiments, the computer-readable medium further comprises program instructions for causing the apparatus to further perform at least the following: estimating radio frequency (RF) conditions, determining, based on the radio frequency conditions estimated, the preconfigured number amongst two or more preconfigured numbers, which are integers and at least one of the two or more preconfigured numbers is greater than one, wherein the two or more preconfigured numbers are associated with respective two or more target block error rates, a preconfigured number with a target block error rate, and using the preconfigured number determined and an associated target block error rate for the transmissions with the hybrid automatic repeat requests.

In embodiments, the computer-readable medium is a non-transitory computer-readable medium.

According to an aspect there is provided a computer program comprising instructions for causing an apparatus to perform at least the following: transmitting a preconfigured number of transmissions of a first data with hybrid automatic repeat requests consecutively without waiting between the transmissions for response to any of the requests, wherein the preconfigured number is an integer and greater than one.

In an embodiment, the computer program further comprises instructions for causing the apparatus to further perform at least the following: estimating radio frequency (RF) conditions, determining, based on the radio frequency conditions estimated, the preconfigured number amongst two or more preconfigured numbers, which are integers and at least one of the two or more preconfigured numbers is greater than one, wherein the two or more preconfigured numbers are associated with respective two or more target block error rates, a preconfigured number with a target block error rate, and using the preconfigured number determined and an associated target block error rate for the transmissions with the hybrid automatic repeat requests.

BRIEF DESCRIPTION OF THE DRAWINGS

In the following, various exemplary embodiments will be described in greater detail with reference to the accompanying drawings, in which

FIGS. 2 to 7 illustrate example functionalities;

DETAILED DESCRIPTION

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first rule could be termed a second rule, and similarly, a second rule could be also termed a first rule without departing from the scope of the present disclosure.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
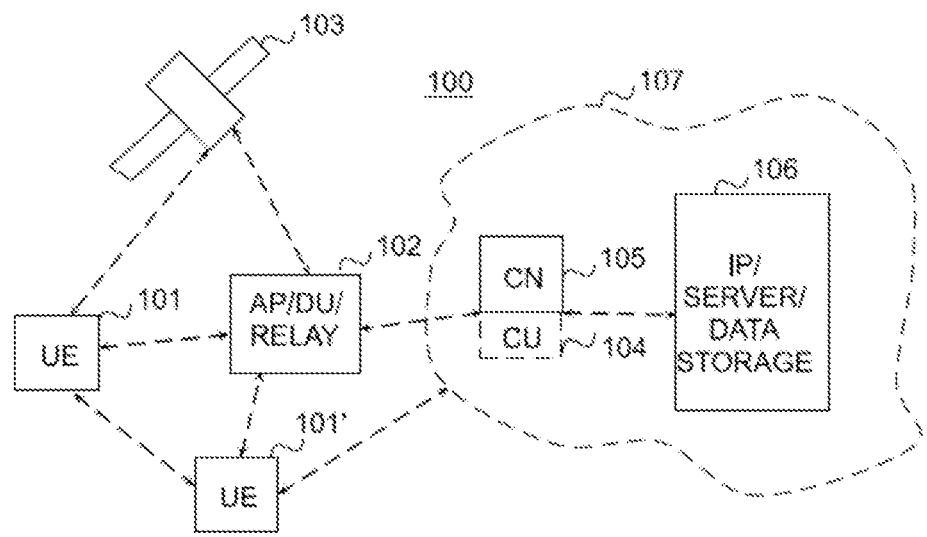
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system 100 given as an example but a person skilled in the art may apply the solution to other communication systems provided with necessary properties.

The example of FIG. 1 shows a part of an exemplifying radio access network.

FIG. 1 shows user devices 101, 101' configured to be in a wireless connection on one or more communication channels with a node 102. The node 102 is further connected to a core network 105. In one example, the node 102 may be an access node such as (e/g)NodeB providing or serving devices in a cell. In one example, the node 102 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), or access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g., to be used in smart power grids and connected vehicles. The user device may also utilise cloud. In some applications, a user device may comprise a user portable device with radio parts (such as a watch, earphones, eyeglasses, other wearable accessories, or wearables) and the computation is carried out in the cloud. The device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors, and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput, and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometres, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)NodeBs, includes, in addition to Home (e/g)NodeBs (H(e/g)NodeBs), a home node B gateway, or HNB-GW (not shown in FIG. 1). A HNB Gateway (HNB-GW), which is typically installed within an operator's network may aggregate traffic from a large number of HNBs back to a core network.

An apparatus configured to send hybrid automatic repeat request (HARQ) transmissions may be configured to use a blind HARQ mechanism, for example as described below with FIGS. 2 to 7.

Figure 2:
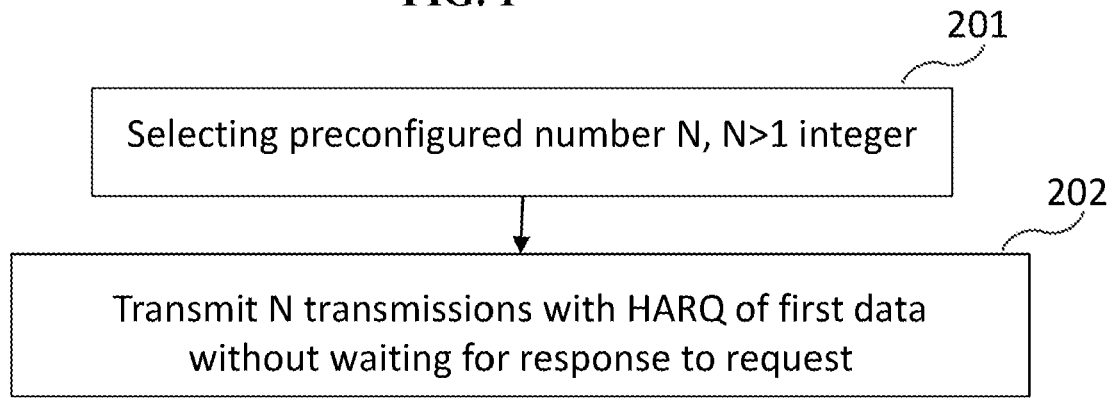

FIG. 2 illustrates an example functionality of an apparatus configured to send HARQ transmissions using a blind mechanism. The preconfigured number N is an integer and greater than 1.

Referring to FIG. 2, a preconfigured number N is selected in block 201. The preconfigured number N of transmissions with hybrid automatic repeat requests are transmitted in block 202 consecutively without waiting for a response to any of the requests between the transmissions, that is, blindly. In an implementation in which one preconfigured number N is used, the block 201 may be omitted and the process starts from block 202.

FIG. 3 illustrates an example of how to implement the blind mechanism, for example, the process described in block 202 of FIG. 2. Times demonstrated here are just examples and depend on, for example, distances between a transmitting entity 301 and a receiving entity 302. The transmitting entity 301 may be the node described with FIG. 1 above possibly using a satellite system, for example, an access node such as gNodeB located on ground or in a satellite. Alternatively, the transmitting entity 301 may be the user device described with FIG. 1 above. The transmitting entity 301 transmits a first transmission with HARQ 303a at time t=0 msec to the receiving entity 302. The receiving entity 302 may be the user device described with FIG. 1 above, or alternatively, the receiving entity 302 may be the node described with FIG. 1 above using a satellite. The transmitting entity 301 transmits a second transmission with HARQ 303b at time t=8 sec, and a third transmission with HARQ 303c at time t=16 msec, a fourth transmission with HARQ 303d at time t=24 msec, and a fifth transmission with HARQ 303e at time t=32 msec. A first response 304a from the receiving entity 302 to the first transmission with HARQ 303a is received by the transmitting entity 301 at time t=48 msec. A second response 304b to the second transmission with HARQ 303b is received at time t=56 msec, a third response 304c to the third transmission with HARQ 303c at time t=64 msec, a fourth response 304d to the fourth transmission with HARQ 303d at time t=72 msec, and a fifth response 304e to the fifth transmission with HARQ 334e at time t=80 msec. Note that in this example five transmissions with HARQ are transmitted before the first response 304a, that is, an acknowledgement (ACK) or a negative acknowledgement (NACK) feedback for the first transmission with HARQ 303a is received by the transmitting entity at time t=48 msec. This means that HARQ transmissions using the blind mechanism may cover high latency scenarios where stop-and-wait HARQ does not work.

Figure 4:
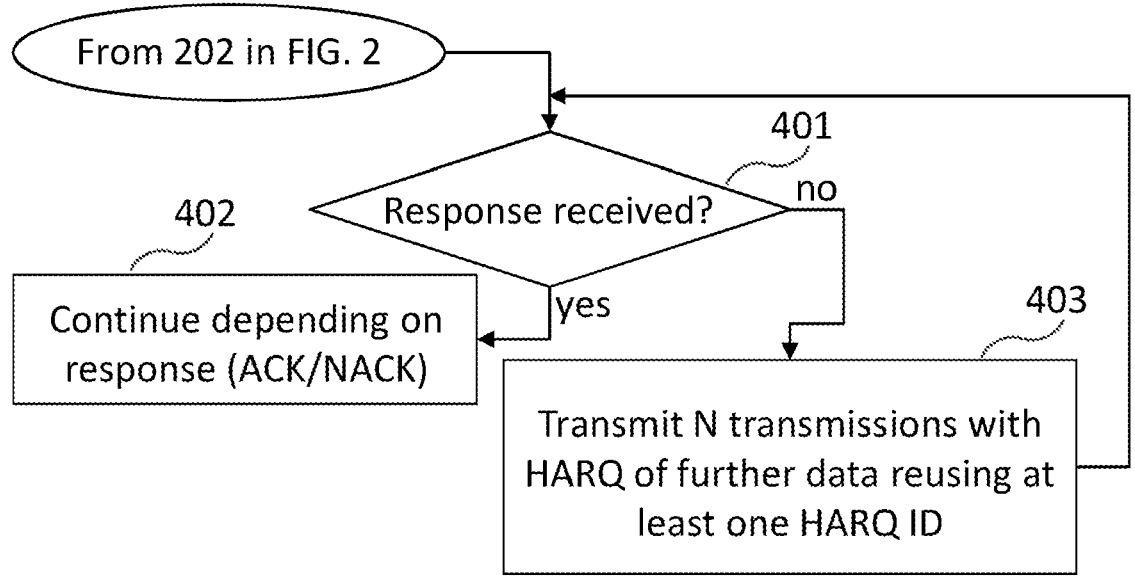

FIG. 4 illustrates an example functionality of an apparatus configured to send HARQ transmissions using a blind mechanism and a reuse of HARQ identifiers in different data packets. The long-term evolution (LTE) standard for frequency division duplex (FDD) supports use of up to eight different HARQ identifiers. The 5G standard allows for up to sixteen different HARQ identifiers. The $3^{rd}$ Generation Partnership Project (3GPP) has proposed allowing for up to 32 different HARQ identifiers. A data indicator, for example, a new data indicator (NDI) bit may be toggled to separate HARQ ID reuse instances in order to make HARQ ID reuse transparent to the receiving entity. Therefore, the transmitting entity is able to match HARQ ID reuse instances of different data packet transmissions to corresponding ACK/NACK responses.

Referring to FIG. 4, the process continues from block 202 in FIG. 2. The process verifies in block 401 if a response to the preconfigured number of transmissions with HARQ of the first data is received. If a response is received (block 401: yes), the process continues in block 402 with a transmission depending on the response. If the response is an acknowledgement (ACK), the process continues with a transmission of another data packet. If the response received is a negative acknowledgement (NACK) for the preconfigured number of transmissions, the process continues with sending the information of a failure in transmissions to a higher level, for example, radio link control (RLC) for a possible retransmission of the same data packet. If no response is received (block 401: no), the preconfigured number of transmissions with hybrid automatic repeat requests of a further data is transmitted in block 403 reusing at least one hybrid automatic repeat request identifier that was used with at least one of the requests transmitted with the first data.

FIG. 5 illustrates an example of how the process of FIG. 4 described above may be implemented. Times demonstrated here are just examples and depend on, for example, distances. Here the preconfigured number of transmissions with HARQ is determined to be two. A transmitting entity 501 transmits a first transmission with HARQ of a first set of data 504a at time t=0 msec to a receiving entity 502. In this example up to 8 different HARQ identifiers 503 may be used parallelly in the transmission, for example, the transmissions of the first set of data may use HARQ identifiers 1-5. The transmitting entity 501 transmits a second transmission with HARQ of the first set of data 504b at time t=8 sec. Two transmissions with HARQ 505a, 505b for a second set of data, which is different from the first set of data, are transmitted at times t=16 msec and t=24 msec. For example, the transmissions of the second set of data may use HARQ identifiers 1-8, and thus, the HARQ identifiers 1-5 would be reused for the transmissions of the second set of data without waiting for the responses to the transmissions of the first set of data. Again, two transmissions with HARQ for a third set of data 506a, 506b reusing at least some of the HARQ identifiers are transmitted at times t=32 msec and t=40 msec, and two transmissions with HARQ for a fourth set of data 507a, 507b reusing at least some of the HARQ identifiers are transmitted at times t=48 msec and t=56 msec. A first response 508a from the receiving entity 502 to the first transmission with HARQ of the first set of data 504a is received by the transmitting entity 501 at time t=48 msec. A second response 508b to the second transmission with HARQ of the first set of data 504b is received at time t=56 msec. Two responses 509a, 509b to the two transmissions with HARQ of the second set of data 505a, 505b reusing at least some of the HARQ identifiers are received at times t=64 msec and t=72 msec. A response 510a to the transmission with HARQ of the third set of data 506a reusing at least some of the HARQ identifiers is received at time t=80 msec.

Figure 6:
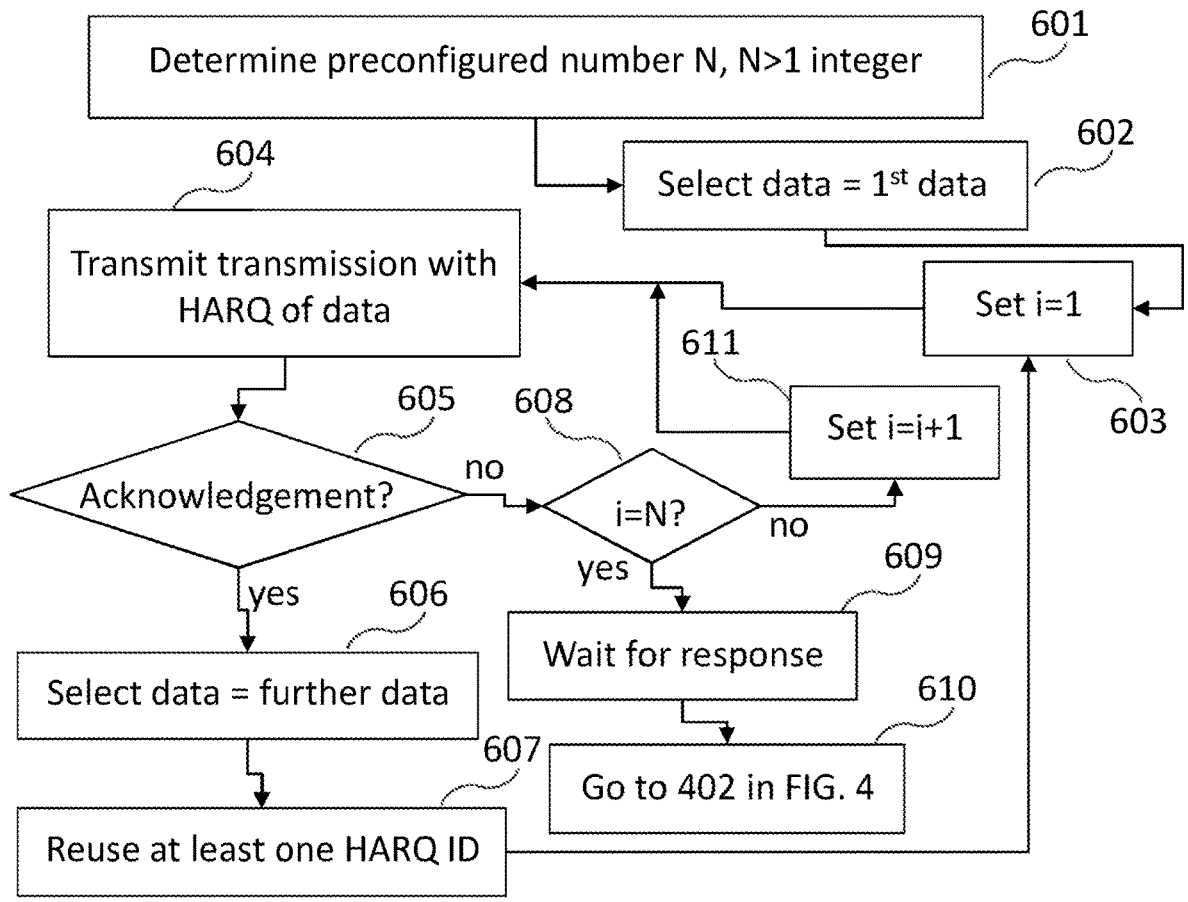

FIG. 6 illustrates an example functionality of an apparatus configured to send HARQ transmissions using a blind mechanism and early stopping.

Referring to FIG. 6, a preconfigured number N is determined in block 601. The preconfigured number N is an integer and greater than 1. A set of data for transmissions is selected in block 602 to be a first set of data. A counter for transmissions i is set in block 603 to 1. A transmission with HARQ of the set of data selected is transmitted in block 604. It is then resolved in block 605 if an acknowledgement response to the transmission is received. If the acknowledgement response is received (block 605: yes), a set of data to be transmitted is selected in block 606 to be a further set of data, at least one of the HARQ identifiers is reused in block 607 for transmissions of the set of data selected, and the counter i is set in block 603 to 1. If no acknowledgement is received (block 605: no), it is then checked in block 608 if the counter i has reached the preconfigured number N. If the counter i and the preconfigured number N are equal (block 608: yes), the process waits for a response in block 609 and then continues in block 610 to block 402 in FIG. 4. If the counter i and the preconfigured number N are not equal (block 608: no), the counter i is increased in block 611 by 1 and the process continues in block 604 with a transmission with HARQ of the set data selected.

Figure 7:
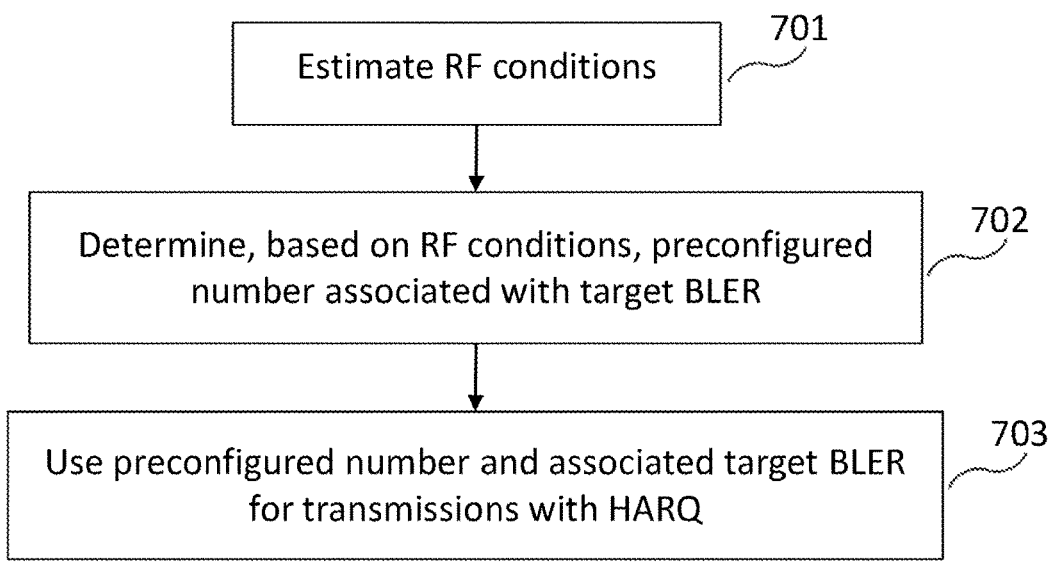

FIG. 7 illustrates an example functionality of an apparatus configured to send an adaptive number of HARQ transmissions using a blind mechanism and an adaptive target block error rate (BLER) based on radio frequency conditions.

Referring to FIG. 7, radio frequency (RF) conditions are estimated in block 701. The preconfigured number is determined in block 702 based on the radio frequency conditions among two or more preconfigured numbers associated with two or more target block error rates. A preconfigured number of the two or more preconfigured numbers may be associated with more than one of the two or more target block error rates, and a target block error rate of the two or more target block error rates may be associated with more than one of the two or more preconfigured numbers. In other words, there may be several different combinations of preconfigured numbers and target block error rates, wherein one combination is configured for one particular portion of the range of radio frequency conditions. The two or more preconfigured numbers are integers and at least one of the two or more numbers is greater than one. The preconfigured number and the associated target block error rate are used in block 703 for transmissions with hybrid automatic repeat requests.

As can be seen from the examples above, introducing the blind HARQ mechanism would reduce the delays caused by the use of low earth orbit satellite system for cellular services.

The blocks, and related functions described above by means of FIGS. 2 to 7 are in no absolute chronological order, and some of them may be performed simultaneously or in an order differing from the given one. Other functions can also be executed between them or within them, and/or other rules applied or selected. Some of the blocks or part of the blocks or one or more pieces of information can also be left out or replaced by a corresponding block or part of the block or one or more pieces of information.

Figure 8:
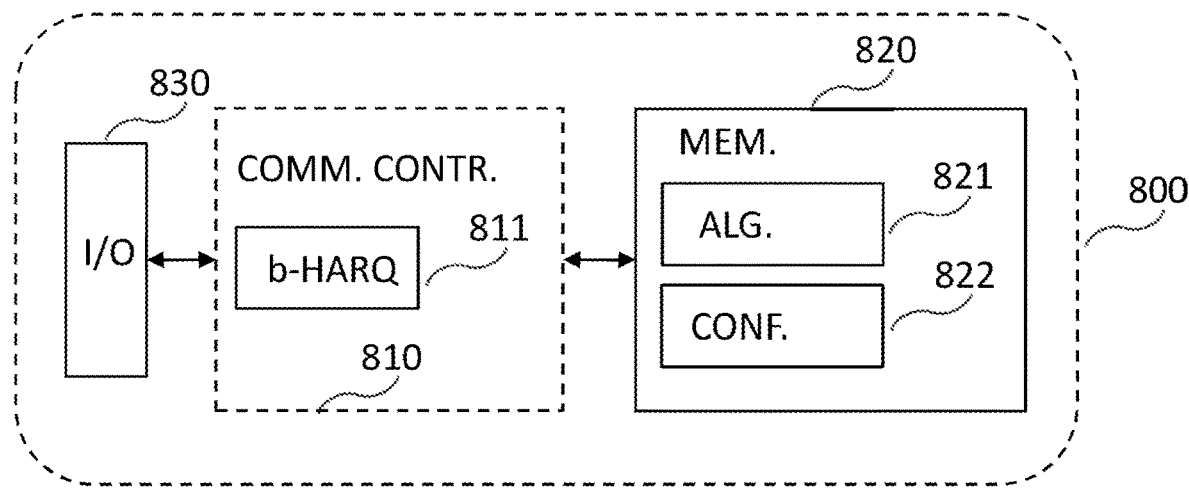
FIG. 8 is a schematic block diagram.

FIG. 8 illustrates an apparatus comprising a communication controller 810 such as at least one processor or processing circuitry, and at least one memory 820 including a computer program code (software, algorithm) ALG. 821, wherein the at least one memory and the computer program code (software, algorithm) are configured, with the at least one processor, to cause the respective apparatus to carry out any one of the embodiments, examples and implementations described above. The apparatus of FIG. 8 may be an electronic device, for example a transmitter for a user device, an access node/base station/gNB, a scheduler, or a scheduling apparatus.

Referring to FIG. 8, the memory MEM. 820 may be implemented using any suitable data storage technology, such as semiconductor based memory devices, flash memory, magnetic memory devices and systems, optical memory devices and systems, fixed memory, and removable memory. The memory may comprise a configuration storage CONF. 822, such as a configuration database, for at least storing one or more configurations and/or corresponding parameters/parameter values, for example the criteria to use for decision(s), or the counter value, or number of sensed consecutive idle slots. The memory 820 may further store a data buffer for uplink data waiting for transmission and/or downlink data waiting to be decoded. The memory 820 may further store a data buffer for scheduling data for determining scheduling prioritization order, for example, priority values, weight values, average opportunistic proportional gain values, average allocated resources values, and/or instantaneous relevance values.

Referring to FIG. 8, the apparatus 800 may further comprise a communication interface I/O 830 comprising hardware and/or software for realizing communication connectivity according to one or more radio communication protocols. The communication interface 830 may provide the apparatus with radio communication capabilities with one or more base stations (access nodes) of a wireless network. The communication interface may comprise standard well-known components such as an amplifier, filter, frequency-converter, (de)modulator, and encoder/decoder circuitries and one or more antennas. Digital signal processing regarding transmission and/or reception of signals may be performed in a communication controller 810. In an embodiment, the communication interface may comprise one or more antenna arrays providing the apparatus with capability of forming directive transmission radio beams and the reception radio beams.

The communication controller 810 may comprise one or more joint blind HARQ circuitry b-HARQ 811 configured to perform sending the HARQ transmissions according to any one of the embodiments/examples/implementations described above. Communication controller 810 may control information exchange relating to communication services and sensing services.

The apparatus 800 may further comprise an application processor (not illustrated in FIG. 8) executing one or more computer program applications that generate a need to transmit and/or receive data. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile device or a similar integrated circuit in a sensor, a cellular network device, or another network device.

In an embodiment, at least some of the processes described in connection with FIGS. 2 to 7 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out any of the embodiments comprises a circuitry including at least one processor and at least one memory including computer program code. When activated, the circuitry causes the apparatus to perform at least some of the functionalities according to any one of the embodiments/examples/implementations of FIGS. 2 to 7, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given Figures, as will be appreciated by one skilled in the art.

Embodiments/examples/implementations as described may also be carried out in the form of a computer process defined by a computer program or portions thereof. Embodiments of the methods described in connection with FIGS. 2 to 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program. For example, the non-transitory medium may be a non-transitory computer readable medium comprising program instructions for causing an apparatus to perform at least the following: determining a fixed number, wherein the fixed number is an integer and greater than one, and sending the fixed number of hybrid automatic repeat request transmissions consecutively without waiting for response.

Even though the invention has been described above with reference to examples according to the accompanying drawings, it is clear that the invention is not restricted thereto but can be modified in several ways within the scope of the appended claims. Therefore, all words and expressions should be interpreted broadly, and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
   at least one processor; and
   at least one memory including computer program code;
   the at least one memory and the computer program code being configured to, with the at least one processor, cause the apparatus at least to perform:
   transmitting a preconfigured number of transmissions of a first data with hybrid automatic repeat requests consecutively without waiting between the transmissions for response to any of the requests, wherein the preconfigured number is an integer and greater than one;
   transmitting, while waiting for response to the requests transmitted with the first data, the preconfigured number of consecutive transmissions of further data; and
   reusing at least one hybrid automatic repeat request identifier, which was used with at least one of the requests transmitted with the first data, with the transmissions of the further data, wherein the at least one memory and the computer program code being configured to, with the at least one processor, cause the apparatus further to perform prior to transmitting:
   estimating radio frequency conditions;
   determining, based on the radio frequency conditions estimated, the preconfigured number amongst two or more preconfigured numbers, which are integers and at least one of the two or more preconfigured numbers is greater than one, wherein the two or more preconfigured numbers are associated with respective two or more target block error rates, a preconfigured number with a target block error rate; and
   using the preconfigured number determined and an associated target block error rate for the transmissions with the hybrid automatic repeat requests in order to make hybrid automatic repeat request identifier reuse transparent to a receiving entity.

2. The apparatus according to claim 1, wherein the at least one memory and the computer program code being configured to, with the at least one processor, cause the apparatus further to perform:
   using a data indicator field in a downlink control indicator to indicate reuse of the hybrid automatic repeat request identifier.

3. The apparatus according to claim 2, wherein the at least one memory and the computer program code being configured to, with the at least one processor, cause the apparatus further to perform:
   changing the data indicator field to allow associating a response to a corresponding transmission when using the at least one hybrid automatic repeat request identifier more than once.

4. A method comprising:
   transmitting a preconfigured number of transmissions of a first data with hybrid automatic repeat requests consecutively without waiting between the transmissions for response to any of the requests, wherein the preconfigured number is an integer and greater than one;
   transmitting, while waiting for response to the requests transmitted with the first data, the preconfigured number of consecutive transmissions of further data; and
   reusing at least one hybrid automatic repeat request identifier, which was used with at least one of the requests transmitted with the first data, with the transmissions of the further data, the method further comprising prior to transmitting:
   estimating radio frequency conditions;
   determining, based on the radio frequency conditions estimated, the preconfigured number amongst two or more preconfigured numbers, which are integers and at least one of the two or more preconfigured numbers is greater than one, wherein the two or more preconfigured numbers are associated with respective two or more target block error rates, a preconfigured number with a target block error rate; and
   using the preconfigured number determined and an associated target block error rate for the transmissions with the hybrid automatic repeat requests in order to make hybrid automatic repeat request identifier reuse transparent to a receiving entity.

5. A non-transitory computer-readable medium comprising program instructions encoded thereon that, when executed on an apparatus, cause the apparatus to perform at least the following:
   transmitting a preconfigured number of transmissions of a first data with hybrid automatic repeat requests consecutively without waiting between the transmissions for response to any of the requests, wherein the preconfigured number is an integer and greater than one;
   transmitting, while waiting for response to the requests transmitted with the first data, the preconfigured number of consecutive transmissions of further data; and
   reusing at least one hybrid automatic repeat request identifier, which was used with at least one of the requests transmitted with the first data, with the transmissions of the further data, the apparatus further caused to perform prior to transmitting:
   estimating radio frequency conditions;
   determining, based on the radio frequency conditions estimated, the preconfigured number amongst two or more preconfigured numbers, which are integers and at least one of the two or more preconfigured numbers is greater than one, wherein the two or more preconfigured numbers are associated with respective two or more target block error rates, a preconfigured number with a target block error rate; and
   using the preconfigured number determined and an associated target block error rate for the transmissions with the hybrid automatic repeat requests in order to make hybrid automatic repeat request identifier reuse transparent to a receiving entity.

6. The non-transitory computer-readable medium according to claim 5, further comprising program instructions for causing the apparatus to further perform at least the following:
   estimating radio frequency conditions;
   determining, based on the radio frequency conditions estimated, the preconfigured number amongst two or more preconfigured numbers, which are integers and at least one of the two or more preconfigured numbers is greater than one, wherein the two or more preconfigured numbers are associated with respective two or more target block error rates, a preconfigured number with a target block error rate; and
   using the preconfigured number determined and an associated target block error rate for the transmissions with the hybrid automatic repeat requests.

* * * * *